US012552623B2

(12) United States Patent
Hatayama

(10) Patent No.: US 12,552,623 B2
(45) Date of Patent: Feb. 17, 2026

(54) SHEET CONTAINER AND IMAGE FORMING APPARATUS INCORPORATING THE SAME

(71) Applicant: Koji Hatayama, Kanagawa (JP)

(72) Inventor: Koji Hatayama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 12 days.

(21) Appl. No.: 18/415,688

(22) Filed: Jan. 18, 2024

(65) Prior Publication Data

US 2024/0246784 A1 Jul. 25, 2024

(30) Foreign Application Priority Data

Jan. 23, 2023 (JP) ................................ 2023-008003
Sep. 15, 2023 (JP) ................................ 2023-149687

(51) Int. Cl.
*B65H 1/12* (2006.01)
*B65H 1/26* (2006.01)
*G03G 15/00* (2006.01)

(52) U.S. Cl.
CPC ............... *B65H 1/12* (2013.01); *B65H 1/266* (2013.01); *G03G 15/6511* (2013.01); *B65H 2405/31* (2013.01)

(58) Field of Classification Search
CPC ................................ B65H 1/12; B65H 1/266
See application file for complete search history.

(56) References Cited

U.S. PATENT DOCUMENTS 4,280,692 A * 7/1981 Hutchinson ........ G03G 15/6502 271/170
5,419,544 A * 5/1995 Ono ....................... B65H 1/266 271/157
5,564,690 A * 10/1996 Oshida ..................... B65H 1/12 271/157
7,448,613 B2 * 11/2008 Takahashi ................ B65H 1/12 271/157
7,862,031 B2 * 1/2011 Kaseda .................... B65H 1/12 271/167
8,448,938 B2 * 5/2013 Ko ......................... B65H 1/266 271/127
2010/0059930 A1 3/2010 Tanaka et al.
2010/0225977 A1 9/2010 Osanai et al.
2013/0168920 A1 * 7/2013 Shin ....................... B65H 3/565 271/152
2013/0222826 A1 8/2013 Osanai et al.
2014/0376014 A1 12/2014 Hatayama et al.
(Continued)

FOREIGN PATENT DOCUMENTS

JP 2007-197161 A 8/2007
JP 2010-064804 A 3/2010

*Primary Examiner* — Patrick Cicchino
(74) *Attorney, Agent, or Firm* — XSENSUS LLP

(57) ABSTRACT

A sheet container includes a body and a feed tray. The body includes a guide rail having a protrusion at a contact position. The feed tray loads multiple sheets. The feed tray is insertable to and removable from the body along the guide rail in a horizontal direction and includes a contact in an upstream portion of the feed tray in a drawing direction along the horizontal direction. In response to the feed tray drawn from the body to the contact position, the contact contacts the protrusion to restrict drawing of the feed tray from the body.

12 Claims, 6 Drawing Sheets

(56) References Cited

U.S. PATENT DOCUMENTS

| | | | |
|---|---|---|---|
| 2016/0127590 | A1 | 5/2016 | Hatayama et al. |
| 2018/0086579 | A1 | 3/2018 | Andoh et al. |
| 2019/0047809 | A1 | 2/2019 | Hirata et al. |

* cited by examiner

SHEET CONTAINER AND IMAGE FORMING APPARATUS INCORPORATING THE SAME

CROSS-REFERENCE TO RELATED APPLICATIONS

This patent application is based on and claims priority pursuant to 35 U.S.C. § 119(a) to Japanese Patent Applications No. 2023-008003, filed on Jan. 23, 2023, and No. 2023-149687, filed on Sep. 15, 2023, in the Japan Patent Office, the entire disclosures of each are hereby incorporated by reference herein.

BACKGROUND

Technical Field

Embodiments of the present disclosure generally relate to a sheet container to store sheets and an image forming apparatus incorporating the sheet container. Such an image forming apparatus is, for example, a copier, a printer, a facsimile machine, or a multifunction peripheral having at least two of copying, printing, scanning, facsimile, and plotter functions.

Related Art

An image forming apparatus such as a copier and a printer includes a sheet container (a sheet feeder). The sheet container includes a feed tray that can be inserted into and removed from the body of the image forming apparatus in a horizontal direction. The feed tray is drawn from the body of the image forming apparatus, and multiple sheets are loaded on the feed tray, or sheets are taken out from the feed tray.

SUMMARY

This specification describes an improved sheet container that includes a body and a feed tray. The body includes a guide rail having a protrusion at a contact position. The feed tray loads multiple sheets. The feed tray is insertable to and removable from the body along the guide rail in a horizontal direction and includes a contact in an upstream portion of the feed tray in a drawing direction along the horizontal direction. In response to the feed tray drawn from the body to the contact position, the contact contacts the protrusion to restrict drawing of the feed tray from the body.

This specification also describes an image forming apparatus that includes an apparatus body and a feed tray. The feed tray is insertable to and removable from the apparatus body in a horizontal direction and loads multiple sheets. The apparatus body includes an apparatus side plate, a guide rail, a protrusion, and a feed roller. The apparatus side plate is at a side end of the apparatus body in a width direction orthogonal to the horizontal direction. The guide rail is on the apparatus side plate and extends from an upstream portion of the apparatus body in a drawing direction in which the feed tray is drawn from the apparatus body along the horizontal direction to a downstream portion of the apparatus body in the drawing direction. The protrusion is on a downstream portion of the guide rail in the drawing direction. The feed roller is above the feed tray in an upstream portion of the apparatus body in the drawing direction. The feed tray includes a support shaft, a stacking plate, a spring, a tray side plate, a projection, and a contact. The support shaft is in a downstream portion of the feed tray in a drawing direction in which the feed tray is drawn from the apparatus body along the horizontal direction. The stacking plate is rotatable about the support shaft in the feed tray. The spring pushes and rotates the stacking plate about the support shaft and brings the sheet on the stacking plate into contact with the feed roller. The tray side plate is at a side end of the feed tray in the width direction and has an opening. The contact projects outside the tray side plate in the width direction through the opening of the tray side plate from an upstream portion of the stacking plate in the drawing direction. The contact is slidable on the guide rail, and the protrusion contacts the contact of the feed tray drawn from the apparatus body.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
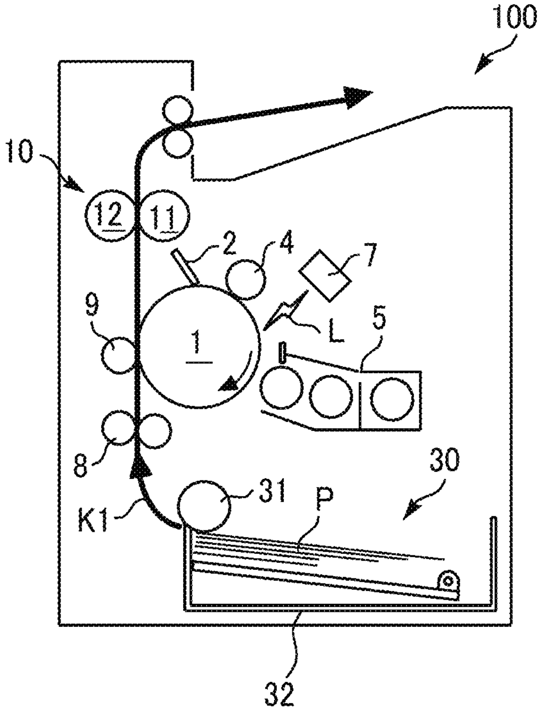
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms “a,” “an,” and “the” are intended to include the plural forms as well, unless the context clearly indicates otherwise.

A description is provided of an image forming apparatus according to the present disclosure with reference to drawings. It is to be noted that the present disclosure is not to be considered limited to the following embodiments but can be changed within the range that can be conceived of by those skilled in the art, such as other embodiments, additions, modifications, deletions, and the scope of the present disclosure encompasses any aspect, as long as the aspect achieves the operation and advantageous effect of the present disclosure.

Embodiments of the present disclosure are described below in detail with reference to the drawings. Identical reference numerals are assigned to identical or equivalent components and a description of those components may be simplified or omitted.

With reference to FIG. 1, a configuration and operation of an image forming apparatus 100 are described below.

In FIG. 1, the image forming apparatus 100 such as a printer includes a photoconductor drum 1, a cleaner 2, a charging roller 4, a developing device 5, an exposure device 7, a registration roller pair 8, a transfer roller 9, a fixing device 10, and a sheet container 30. The photoconductor drum 1 forms a toner image on a surface thereof. The exposure device 7 irradiates the photoconductor drum 1 with exposure light L that is generated based on image data input from an input device such as a personal computer. The registration roller pair 8 is a pair of timing rollers to convey a sheet P toward a transfer nip where the photoconductor drum 1 and the transfer roller 9 contact with each other. The transfer roller 9 transfers the toner image borne on the photoconductor drum 1 onto the sheet P to be conveyed to the transfer nip (that is, a transfer position). The fixing device 10 includes a fixing roller 11 and a pressure roller 12 and fixes the toner image that has not yet been fixed, to the sheet P. The sheet container 30 includes a feed tray 32 to store sheets P. The charging roller 4, the developing device 5, and the cleaner 2 are disposed around the photoconductor drum 1.

With reference to FIG. 1, typical processes of the image forming apparatus 100 are described below. The input device such as the personal computer sends the image data to the exposure device 7 in the image forming apparatus 100, and the exposure device 7 irradiates the surface of the photoconductor drum 1 with the exposure light (a laser beam) L based on the image data. The photoconductor drum 1 rotates in a direction indicated by an arrow in FIG. 1, that is, a clockwise direction. Initially, the charging roller 4 uniformly charges the surface of the photoconductor drum 1 opposite the charging roller 4, which is called a charging process. As a result, a charging potential is formed on the surface of the photoconductor drum 1. In the present embodiment, the charging potential on the photoconductor drum 1 is approximately −900 V. Then, as the photoconductor drum 1 further rotates, the charged surface of the photoconductor drum 1 is brought to a light emitting position of the exposure light L. An electric potential at the position that receives the exposure light L changes to a latent image potential (about 0 to −100 V), and an electrostatic latent image is formed on the surface of the photoconductor drum 1, which is called an exposure process.

The surface of the photoconductor drum 1 bearing the electrostatic latent image thereon then reaches a position opposite the developing device 5. The developing device 5 supplies toner onto the photoconductor drum 1, and the latent image formed on the photoconductor drum 1 is thereby developed into a toner image, which is called a developing process.

After the developing process, the surface of the photoconductor drum 1 bearing the toner image thereon reaches the transfer nip (that is, the transfer position) formed between the photoconductor drum 1 and the transfer roller 9. A power source applies a transfer bias to the transfer roller 9 in the transfer nip. This transfer bias has a polarity different from the polarity of toner. By application of the transfer bias to the transfer roller 9, the toner image formed on the surface of the photoconductor drum 1 is transferred onto the sheet P that is conveyed by the registration roller pair 8, which is called a transfer process.

The surface of the photoconductor drum 1 after the transfer process reaches a position opposite the cleaner 2. At the position opposite the cleaner 2, a cleaning blade mechanically removes untransferred toner remaining on the surface of the photoconductor drum 1, and the removed toner is collected in the cleaner 2, which is called a cleaning process.

A series of image forming processes on the photoconductor drum 1 is thus completed.

The sheet P is conveyed to the transfer nip (i.e., the transfer position) between the photoconductor drum 1 and the transfer roller 9 as follows.

A feed roller 31 feeds the uppermost sheet P of the sheets P stored in the feed tray 32 of the sheet container 30 toward a conveyance passage K1. Subsequently, the sheet P reaches the registration roller pair 8. The sheet P is fed from the position of the registration roller pair 8 to the transfer nip (i.e., a contact position of the transfer roller 9 with the photoconductor drum 1) in synchronization with an entry of the toner image formed on the photoconductor drum 1 into the transfer nip.

After the transfer process, the sheet P passes through the transfer nip (i.e., the position of the transfer roller 9) and reaches the fixing device 10 through the conveyance passage. In the fixing device 10, the sheet P is interposed between the fixing roller 11 and the pressure roller 12. The toner image is fixed on the sheet P by heat applied from the fixing roller 11 and pressure applied from both the fixing roller 11 and the pressure roller 12. After the sheet P having the fixed toner image thereon is ejected from the fixing nip formed between the fixing roller 11 and the pressure roller 12, the sheet P is ejected from the body of the image forming apparatus 100 and stacked on an output tray.

Thus, a series of the image forming processes is completed.

The following describes a configuration of the sheet container 30 and operations of the sheet container 30, which are characteristic of the image forming apparatus 100 according to the present embodiment.

Figure 2:
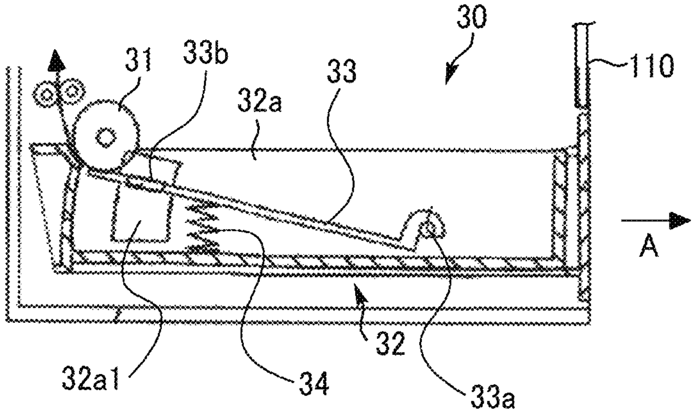
FIG. 2 is a schematic diagram illustrating a configuration of a sheet container included in the image forming apparatus in FIG. 1.
Figure 3:
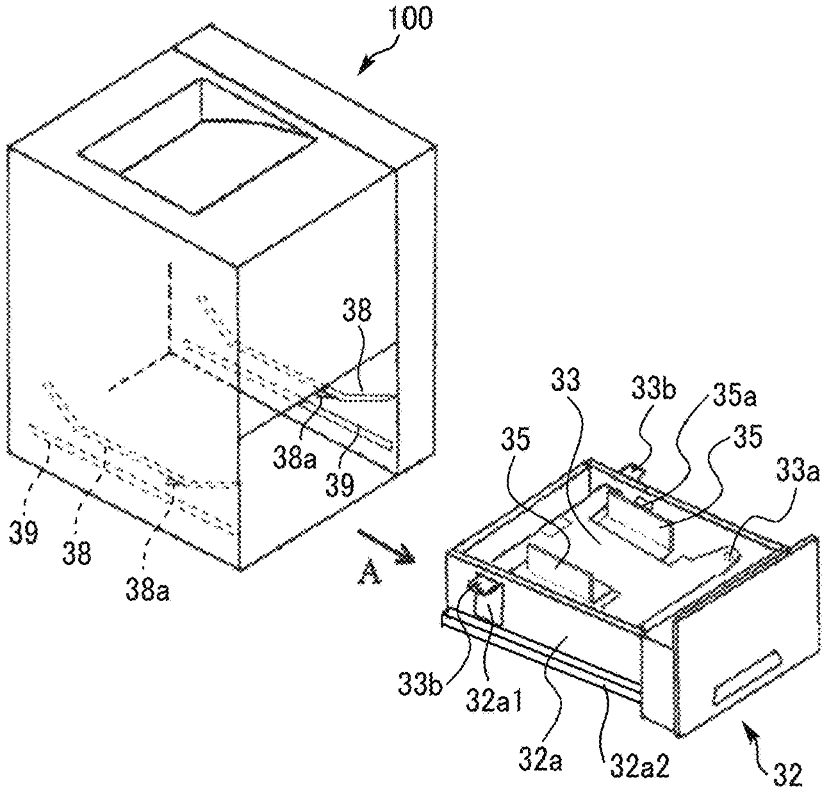
FIG. 3 is a schematic perspective view of a body of the image forming apparatus and a feed tray completely pulled out from the body.

As illustrated in FIGS. 2 and 3, the sheet container 30 according to the present embodiment includes the feed roller 31 and the feed tray 32. The feed roller 31 is disposed in the body of the sheet container 30 to feed the sheet P stored in the feed tray 32 toward the conveyance passage K1. In the present embodiment, the body of the sheet container 30 is integrated with the body of the image forming apparatus 100, which may referred to as an apparatus body. The feed tray 32 stores multiple sheets P and is installed in the body of the sheet container 30 (that is the body of the image forming apparatus 100) so that the feed tray 32 can be inserted into and removed from the body in a horizontal direction (defined as including a substantially horizontal direction). Specifically, the feed tray 32 is drawn from the body of the sheet container 30 in a direction indicated by an arrow A in FIGS. 2 and 3 and is inserted into the body in a direction opposite to the direction indicated by the arrow A.

Although the sheet container 30 in the present embodiment includes the feed roller 31 in addition to the feed tray 32, the sheet container 30 may not include the feed roller 31 and for example, may include only the feed tray 32.

The feed tray 32 is drawn from the body of the image forming apparatus 100 to replenish the sheets P in the feed tray 32 or take out the sheet P from the feed tray 32. For easy understanding, FIG. 3 illustrates the feed tray 32 completely taken out from the body of the image forming apparatus 100, but as described below, the sheet container 30 in the present embodiment is configured such that the feed tray 32 is difficult to be completely taken out from the body of the image forming apparatus 100 (see FIGS. 5A to 5C).

Figure 4:
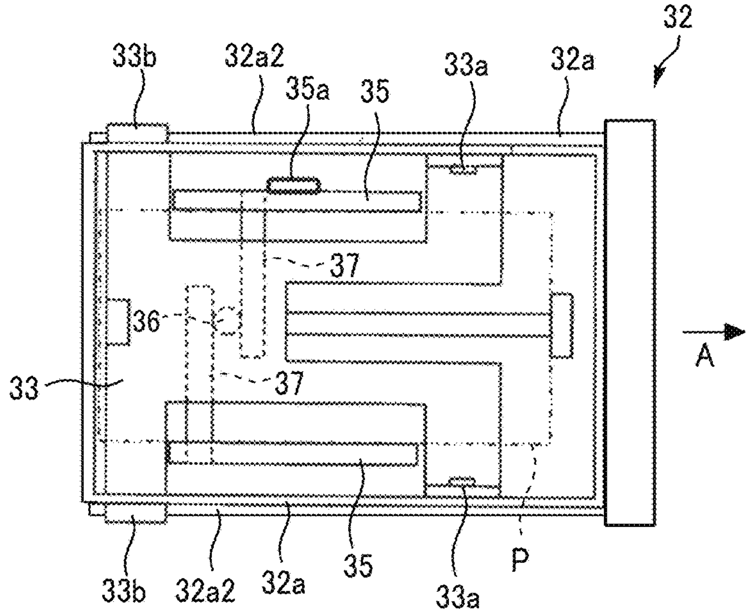
FIG. 4 is a top view of the feed tray.

Referring to FIGS. 2 to 4, the feed tray 32 has a box shape and includes a stacking plate 33, a compression spring 34 as a biasing member, a pair of side fences 35, side plates disposed at both ends in a width direction of the sheet P, and pinion and rack mechanisms 36 and 37. Additionally, the feed tray 32 includes projections 32*a*2 on the side plates of the feed tray 32.

The feed tray 32 includes a support shaft 33*a* in a downstream portion of the feed tray 32 in a drawing direction indicated by an arrow A in FIGS. 2 and 4. The downstream portion is a right side portion of the feed tray 32 in FIGS. 2 and 4. The stacking plate 33 on which multiple sheets P are stacked can rotate about the support shaft 33*a*. The compression spring 34 functions as the biasing member that biases the stacking plate 33 so that the uppermost sheet P of the multiple sheets P loaded on the stacking plate 33 that is rotated about the support shaft 33*a* abuts against the feed roller 31. The feed roller 31 is disposed in an upstream portion of the body of the image forming apparatus 100 in the drawing direction. The upstream portion is a left side portion of the body in FIGS. 2 and 4. The feed roller 31 is disposed above the feed tray 32. The compression spring 34 pushes the stacking plate 33 upward. The feed roller 31 contacts the sheet P on the stacking plate 33 and feeds the sheet P toward the conveyance passage K1.

Referring to FIG. 4 (and FIG. 3), the pair of side fences 35 is movable in the width direction of the sheet P to position the multiple sheets stacked on the stacking plate 33. The width direction is a vertical direction in FIG. 4 and a direction orthogonal to the drawing direction. The pinion and rack mechanisms 36 and 37 move the pair of side fences 35 in the width direction. Specifically, the pair of side fences 35 are arranged to face each other in the width direction, and racks 37 are on the bottom of the feed tray and extend in the width direction. The racks 37 are arranged so as to sandwich the pinion 36. In the above-described configuration, manually moving one of the side fences 35 in the width direction causes the other one of side fences 35 to move in the width direction, which enables increasing or decreasing the distance between the side fences 35. The above-described manual operation of the pair of side fences 35 determines the position of the sheet P in the width direction in accordance with the size of the sheet P in the width direction.

A lock lever 35*a* is on the upper portion of one of the side fences 35. An operator holds the lock lever 35*a* to move the side fences 35, and the lock lever 35*a* not held by the operator locks the side fences 35 so that the side fences 35 cannot be operated.

Referring to FIG. 3 (and FIG. 4), the projection 32*a*2 projects from a lower portion of a side plate 32*a* of the feed tray 32 toward the outside of the feed tray 32 in the width direction and extends over substantially the entire region of the feed tray 32 in the drawing direction that is the direction indicated by the arrow A. The image forming apparatus 100 includes guide rails 38 and 39 extending in the drawing direction on the inner faces of both side plates at both side ends of the body of the image forming apparatus 100 in the width direction that is orthogonal to the drawing direction. The guide rails 38 and 39 in the image forming apparatus 100 guide the projections 32*a*2 when the feed tray 32 is inserted into and removed from the body of the image forming apparatus 100.

Specifically, the image forming apparatus 100 includes upper guide rails 38 and lower guide rails 39. The upper guide rails 38 and the lower guide rails 39 extend from the upstream portion of the body of the image forming apparatus 100 to a downstream portion of the body of the image forming apparatus 100 in the drawing direction. The lower guide rail 39 horizontally extends over an entire region of the side plate of the image forming apparatus 100 in the drawing direction indicated by the arrow A in FIG. 3. The upper guide rail 38 includes an upstream tapered portion, a center portion, and a downstream tapered portion arranged in the drawing direction. The center portion is formed in parallel with the lower guide rail 39 with a constant opposing distance. The distance between the lower guide rail 39 and the upstream tapered portion increases toward an upstream end of the body of the image forming apparatus 100 in the drawing direction. The distance between the lower guide rail 39 and the downstream portion increases toward a downstream end of the body in the drawing direction. When the feed tray 32 is inserted into and removed from the body of the image forming apparatus 100, the projections 32*a*2 slide on the lower guide rails 39. At this time, the upper guide rails 38 restrict the upward movement of the projections 32*a*2.

The upper guide rail 38 also restricts the vertical movement (in other words, rotation about the support shaft 33*a*) of the stacking plate 33. Specifically, the stacking plate 33 includes contacts 33*b* (see FIGS. 2 to 5) at the distal ends upstream in the drawing direction of both sides of the stacking plate 33 in the width direction. While the feed tray 32 is inserted into and removed from the body of the image forming apparatus 100, the contact 33*b* of the stacking plate 33 urged by the compression spring 34 moves along the upper guide rail 38. The upstream tapered portion of the upper guide rail 38 in the drawing direction rotates the stacking plate 33 upward when the feed tray 32 approaches the feed roller 31 and rotates the stacking plate 33 downward when the feed tray 32 separates from the feed roller 31. As a result, the upstream tapered portion enables smooth insertion and removal of the feed tray 32. The downstream tapered portion of the upper guide rail 38 in the drawing direction enhances the workability of placing the feed tray 32 in the body of the image forming apparatus 100 after the feed tray 32 is completely removed from the body of the image forming apparatus 100, but the downstream tapered portion may be omitted as illustrated in FIGS. 5A to 5C.

Figure 5A:
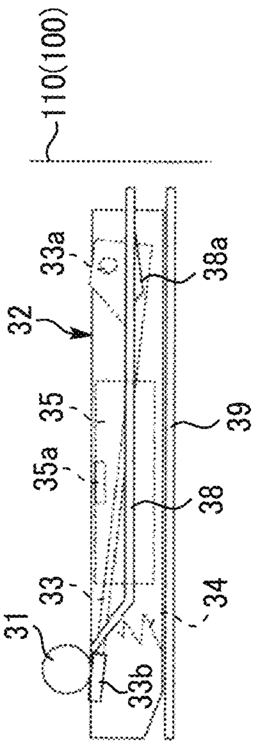
FIGS. 5A to 5C are schematic diagrams illustrating processes when the feed tray is drawn from the body of the image forming apparatus.
Figure 5B:
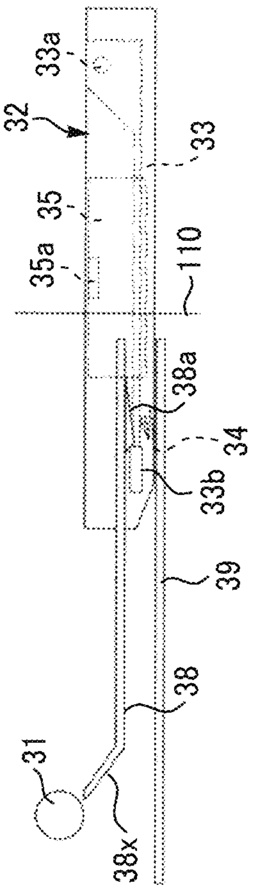
Figure 5C:
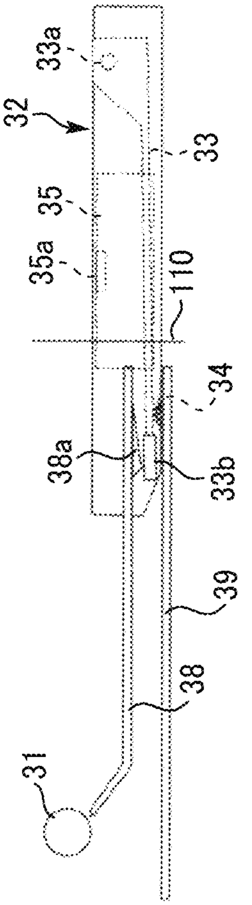

As illustrated in FIGS. 5A to 5C, the image forming apparatus 100 includes a protrusion 38*a* on each of both side plates. The protrusion 38*a* protrudes from the upper guide rail 38 toward the lower guide rail 39. The protrusion 38*a* is at a contact position in a downstream portion of the body of the image forming apparatus 100 in the drawing direction in which the feed tray 32 is drawn from the body of the image forming apparatus 100. The downstream portion of the body of the image forming apparatus 100 is a right portion of the body of the image forming apparatus 100 in FIGS. 5A to 5C.

The contact 33*b* is in an upstream portion of the feed tray 32 in the drawing direction. The feed tray 32 is installed in the body of the image forming apparatus 100 as illustrated in FIG. 5A and is drawn to the contact position illustrated in FIG. 5B. As illustrated in FIG. 5B, the contact 33*b* abuts against the protrusion 38*a* and prevents the feed tray 32 from being further drawn in the drawing direction. Increasing a force to draw the feed tray 32 moves the contact 33*b* along the protrusion 38*a* as illustrated in FIG. 5C. Subsequently, the feed tray 32 is horizontally drawn in the drawing direction.

In other words, a relatively small force, which is referred to as an initial force, can draw the feed tray 32 while the feed tray 32 is drawn from a position illustrated in FIG. 5A to the position illustrated in FIG. 5B at which the contact 33*b* abuts against the protrusion 38*a*. However, after the contact 33*b* abuts against the protrusion 38*a* as illustrated in FIG. 5B, the initial force is not enough to draw the feed tray 32, and a force to draw the feed tray 32 and cause the contact 33*b* to climb over the protrusion 38*a*, which is also referred to as a climbing force, is larger than the initial force. As a result, the operator's operation to draw the feed tray 32 is temporarily restricted after the contact 33*b* abuts on the protrusion 38*a* as illustrated in FIG. 5B, reducing a disadvantage that the feed tray 32 is excessively drawn.

As illustrated in FIGS. 3 and 4, the feed tray 32 includes side plates 32*a* standing at both ends of the feed tray 32 in the width direction. As illustrated in FIGS. 2 and 3, the side plates 32*a* have openings 32*a*1. As illustrated in FIGS. 2 to 5C, the contact 33*b* is on each of both sides of the upstream portion of the stacking plate 33 in the drawing direction and projects through the opening 32*a*1 toward the outside of the feed tray 32. The opening 32*a*1 in the side plate 32*a* is formed so as not to hinder the vertical movement of the contact 33*b* in accordance with the vertical movement of the stacking plate 33 described above.

The protrusion 38*a* is on a downstream portion of the upper guide rail 38 in the drawing direction. The protrusion 38*a* has a shape like a mountain (in other words, a triangle) protruding downward from the lower face of the upper guide rail 38. While the feed tray 32 is drawn from the position illustrated in FIG. 5B to the position illustrated in FIG. 5C, the contact 33*b* of the stacking plate 33 pushed by the compression spring 34 climbs over the protrusion 38*a* having the shape like the mountain and moves (in other words, retreats) downward against the biasing force of the compression spring 34.

The upstream portion of the stacking plate 33 on which the contact 33*b* is formed is upstream from the center of the stacking plate 33 in the drawing direction that is also the longitudinal direction of the stacking plate 33. As illustrated in FIGS. 2 to 5C, the contact 33*b* in the present embodiment is at one end of the stacking plate 33 that is opposite the other end of the stacking plate 33 supported by the support shaft 33*a*, and the one end of the stacking plate 33 rotates about the support shaft 33*a*. The downstream portion of the upper guide rail 38 on which the protrusion 38*a* is formed is downstream from the center of the upper guide rail 38 in the drawing direction. The protrusion 38*a* has the shape like the mountain (in other words, the triangle) as described above. The shape like the mountain has an upstream inclined face and a downstream inclined face arranged in the drawing direction. The upstream inclined face extends in the drawing direction and is inclined downward. The downstream inclined face extends in the drawing direction and is inclined upward. The downstream inclined face is more gently inclined than the upstream inclined face. The contact 33*b* slides along the upstream inclined face, and the upstream inclined face has an angle to generate the climbing force for the contact 33*b* to climb over the upstream inclined face larger than the initial force for the contact 33*b* to slide along the guide rail. The above-described structure achieves the function of restricting the removal of the feed tray 32 and the operability in performing a special operation of completely removing the feed tray 32 from the body of the image forming apparatus 100 in a well-balanced manner.

While the feed tray 32 is drawn from the body of the image forming apparatus 100 (in other words, while the feed tray 32 is drawn from the position illustrated in FIG. 5A), moving the contact 33*b* of the stacking plate 33 downward along the upper guide rail 38 rotates the stacking plate 33 around the support shaft 33*a* against the force of the compression spring 34. At this time, the stacking plate 33 is lowered along the bottom of the feed tray 32.

Further moving the feed tray 32 in the drawing direction causes the contact 33*b* to abut on the protrusion 38*a* on the upper guide rail 38 as illustrated in FIG. 5B, which restricts further drawing the feed tray 32 from the position at which the contact 33*b* abuts on the protrusion 38*a* (in other words, causes difficulty in drawing the feed tray 32).

At a position of the feed tray 32 when the contact 33*b* abuts on the protrusion 38*a* (that is, the position illustrated in FIG. 5B), the feed tray 32 drawn from the body of the image forming apparatus 100 and exposing a space above the feed tray 32 allows operations such as moving the pair of side fences 35 in the width direction (that is, operating the lock lever 35*a*), placing the sheets P on the stacking plate 33, and removing the sheets P on the stacking plate 33. In other words, the pair of side fences 35 is outside the body of the image forming apparatus 100 at this time. As illustrated in FIG. 5B, a part of the feed tray 32 is drawn from a front side plate 110 of the body and exposed, and operations such as moving the side fences 35 and placing or removing the sheet P are performed without further drawing the feed tray 32.

After the operations such as moving the side fences 35 and placing or removing the sheet P, the feed tray 32 is inserted into the body of the image forming apparatus 100 in a procedure reverse to the operation when the feed tray 32 is drawn.

After the contact 33*b* is in contact with the protrusion 38*a* as illustrated in FIG. 5B, increasing the force to draw the feed tray 32 in the drawing direction moves the contact 33*b* in a direction in which the contact 33*b* retreats from the protrusion 38*a* (in other words, the contact 33*b* climbs over the protrusion 38*a*), which moves the stacking plate 33 against the biasing force of the compression spring 34. The feed tray 32 maintaining a horizontal posture is drawn in the drawing direction and removed from the body of the image forming apparatus 100. The above-described operation to remove the feed tray 32 from the image forming apparatus 100 is not necessary to perform the operations such as moving the side fences 35 and placing or removing the sheet P but is necessary to perform other special operations (for example, maintenance of the feed tray 32 itself).

Even in the operation to remove the feed tray 32 from the image forming apparatus 100, the above-described structure can enhance the workability because the feed tray 32 can be drawn while maintaining the horizontal posture without temporarily inclining the posture.

The feed tray 32 at the position illustrated in FIG. 5C is inserted into the body of the image forming apparatus 100 in a procedure reverse to the operation when the feed tray 32 is drawn.

After the feed tray 32 is drawn from the body of the image forming apparatus 100 to expose the inside of the feed tray 32 so as to allow the operations such as moving the side fences 35 and placing or removing the sheet P, the contacts 33*b* in the sheet container 30 according to the present embodiment abut on the protrusions 38*a* to generate load restricting the operation of drawing the feed tray 32 as described above. As a result, the above-described structure is less likely to cause the disadvantage that the feed tray 32 is excessively drawn in the drawing direction and falls off from the body of the image forming apparatus 100.

In the present embodiment, the contact 33*b* has a first contact face contacting the protrusion 38*a*, the protrusion 38*a* has a second contact face contacting the contact 33*b*, and at least one of the first contact face and the second contact face is made of a low friction material having a smaller friction coefficient than the side plate 32*a* of the feed tray 32.

The above-described structure reduces the disadvantage of wear and deterioration due to sliding contact between the contact 33*b* and the protrusion 38*a* when the feed tray 32 is drawn from the position illustrated in FIG. 5B to the position illustrated in FIG. 5C (or when the feed tray 32 is moved from the position illustrated in FIG. 5C to the position illustrated in FIG. 5B).

In particular, since the contact 33*b* is in sliding contact with portions of the upper guide rail 38 other than the protrusion 38*a*, it is useful to form the face of the contact 33*b* with a low friction material. Specifically, embodiments of the face of the contact made of a low friction material include the contact 33*b* itself made of the low friction material such as fluororesin, the contact 33*b* covered with another member made of the low friction material, and the contact 33*b* having the face coated with the low friction material such as fluororesin.

The following describes a first modification of the present embodiment.

As illustrated in FIGS. 6A to 6F, the feed tray 32 in the first modification includes links 40 on both side plates 32*a*, which is different from the feed tray illustrated in FIGS. 2 to 5C. The vertical movement (in other words, rotation) of the contact 33*b* (that is, the stacking plate 33) is performed via the links 40.

As illustrated in FIGS. 6A to 6F, the feed tray 32 in the first modification includes the link 40 rotatable around a rotation shaft 40*a* that is on the side plate 32*a*. In addition, the feed tray 32 in the first modification includes a tension spring 41 on the side plate 32*a* to bias the link 40 to rotate clockwise about the rotation shaft 40*a*.

Figure 6A:
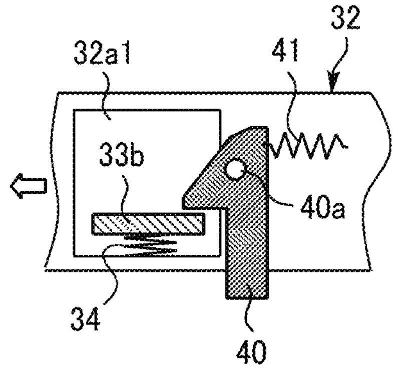
FIGS. 6A and 6B are schematic diagrams illustrating operations of main parts when a feed tray according to a first modification is inserted into the body of the image forming apparatus.
Figure 6B:
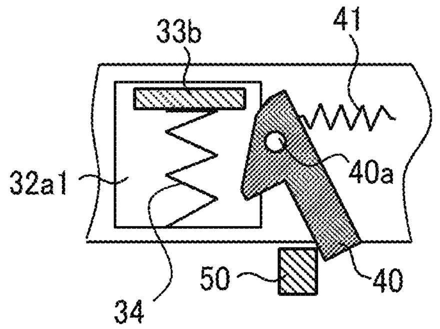

As illustrated in FIG. 6A, the link 40 pushes the contact 33*b* of the stacking plate 33 downward against the biasing force of the compression spring 34 in the feed tray 32 removed from the body of the image forming apparatus 100. At this time, the link 40 is in contact with the frame body of the side plate 32*a*, which prevents the link 40 from rotating clockwise about the rotation shaft 40*a*. The feed tray 32 is inserted into the body of the image forming apparatus 100 in a direction indicated by a white arrow in FIG. 6A and approaches the feed roller 31. The body of the image forming apparatus 100 includes pushing projections 50 near the feed roller 31 on the lower guide rails 39. As illustrated in FIG. 6B, the pushing projection 50 pushes the lower portion of the link 40, and the link 40 rotates counterclockwise about the rotation shaft 40*a*. After the links 40 rotate counterclockwise, the links 40 do not push the contacts 33*b* of the stacking plate 33. In other words, the contacts 33*b* are released. The biasing force of the compression spring 34 moves the contacts 33*b* of the stacking plate 33 upward and rotates the stacking plate 33. As a result, the uppermost sheet P of the sheets on the stacking plate 33 comes into contact with the feed roller 31. The feed roller 31 can feed the sheet P of the sheets stored in the sheet container 30.

Figure 6C:
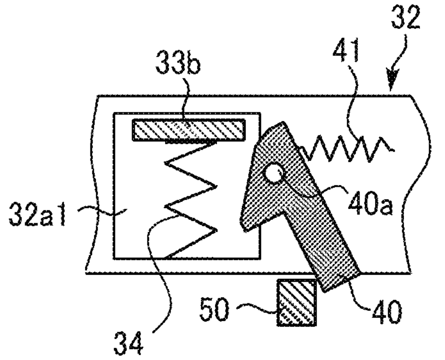
FIGS. 6C to 6F are schematic diagrams illustrating operations of the main parts when the feed tray according to the first modification is drawn from the body of the image forming apparatus.
Figure 6D:
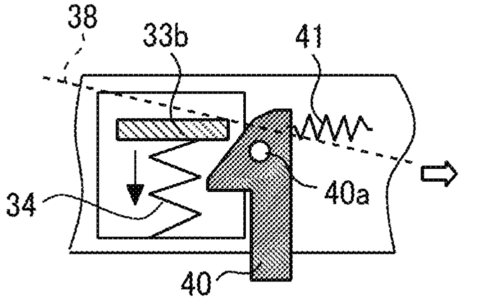
Figure 6E:
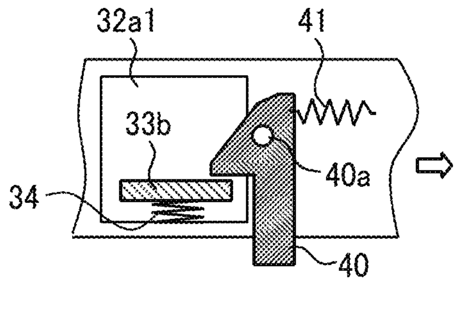
Figure 6F:
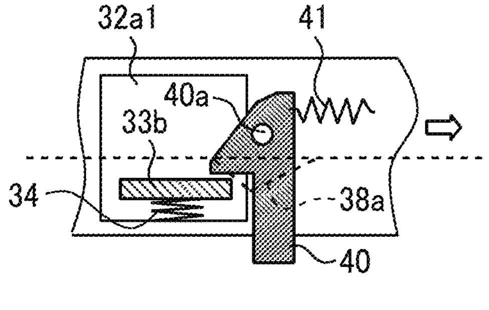

In contrast, the feed tray 32 installed in the body of the image forming apparatus 100 is drawn from the body of the image forming apparatus 100 as illustrated in FIGS. 6C to 6F as follows. The feed tray 32 installed in the body of the image forming apparatus 100 as illustrated in FIG. 6C is drawn and moved in a direction indicated by a white arrow in FIG. 6D. As illustrated in FIG. 6D, the contact 33*b* moves downward along the inclination of the upstream tapered portion of the upper guide rail 38. Then, the contact 33*b* climbs over the inclination of the link 40 against the biasing force of the tension spring 41, and the link 40 pushes the contact 33*b* of the stacking plate 33 again as illustrated in FIG. 6E. Further drawing the feed tray 32 in the direction indicated by the white arrow causes the contact 33*b* to abut on the protrusion 38*a* on the upper guide rail 38 as illustrated in FIG. 6F. As a result, further drawing the feed tray 32 is restricted. The subsequent operations of the feed tray 32 drawn are the same as those described with reference to FIGS. 5B and 5C.

The above-described structure is also less likely to cause the disadvantage that the feed tray 32 is excessively drawn from the body of the image forming apparatus 100 in the drawing direction and falls off from the body of the image forming apparatus 100.

In addition, the feed tray 32 according to the first modification including the links 40 can maintain the stacking plate 33 to be the lower portion of the feed tray 32 (because the links 40 pushes the contacts 33*b* as illustrated in FIG. 6A) even after the feed tray 32 is removed from the body of the image forming apparatus 100.

The following describes a second modification of the present embodiment.

Figure 7A:
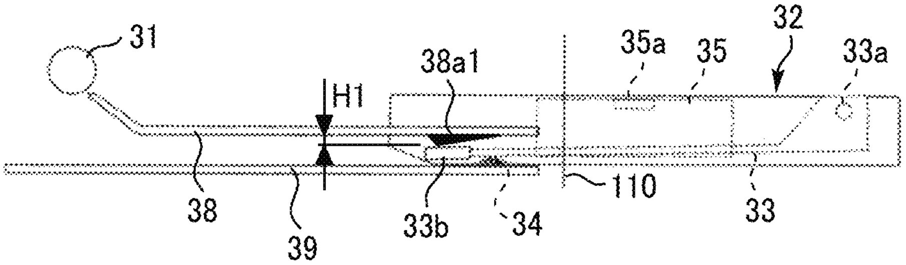
FIGS. 7A and 7B are schematic diagrams illustrating a sheet container according to a second modification to illustrate a contact of the feed tray climbing over a protrusion on a guide rail.
Figure 7B:
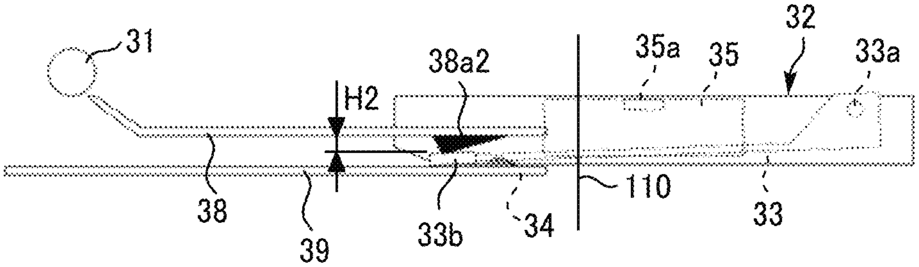

As illustrated in FIGS. 7A and 7B, in the sheet container 30 according to the second modification, multiple protrusions 38*a*1 and 38*a*2 are prepared, selected, and attached to each of the upper guide rails 38 to adjust a movement amount of the contact 33*b* of the stacking plate 33 retracting downward. Each of the multiple protrusions 38*a*1 and 38*a*2 has a structure to be attachable to and detachable from the upper guide rail 38. For example, each of the protrusions 38*a*1 and 38*a*2 may have a small projection that is elastically deformable, and each of the upper guide rails 38 may have a through hole through which the small projection is elastically deformed and passes. The small projection passing through the through hole is elastically expanded to fix the protrusion to the upper guide rail 38. Alternatively, the protrusion may have a threaded hole, the upper guide rail may have a through hole, and a screw may fix the protrusion on the upper guide rail.

FIG. 7A illustrates a first protrusion 38*a*1 protruding downward from the lower face of the upper guide rail 38. The first protrusion 38*a*1 has a height H1 from the lower face of the upper guide rail 38 to the lowest position of the first protrusion 38*a*1 as illustrated in FIG. 7A. FIG. 7B illustrates a second protrusion 38*a*2 protruding downward from the lower face of the upper guide rail 38. The second protrusion 38*a*2 has a height H2 from the lower face of the upper guide rail 38 to the lowest position of the second protrusion 38*a*2 as illustrated in FIG. 7B. As illustrated in FIGS. 7A and 7B, the height H1 is lower than the height H2 (H1<H2). As a result, a load to draw the feed tray 32 from the position illustrated in FIG. 5B to the position illustrated in FIG. 5C via the second protrusion 38*a*2 disposed on the upper guide rail 38 as illustrated in FIG. 7B is larger than a load to draw the feed tray 32 from the position illustrated in FIG. 5B to the position illustrated in FIG. 5C via the first protrusion 38*a*1 disposed on the upper guide rail 38 as illustrated in FIG. 7A. Drawing the feed tray 32 via the second protrusion 38*a*2 is more difficult than drawing the feed tray 32 via the first protrusion 38*a*1.

The above-described structure including the multiple protrusions 38*a*1 and 38*a*2 that have different heights and are attachable to and detachable from the upper guide rail 38 (in other words, exchangeable protrusions) enables adjusting the force to draw the feed tray 32 from the position illustrated in FIG. 5B to the position illustrated in FIG. 5C in accordance with the desire of the user.

The above-described structure is also less likely to cause the disadvantage that the feed tray 32 is excessively drawn from the body of the image forming apparatus 100 in the drawing direction and falls off from the body of the image forming apparatus 100.

In the second modification, two types of protrusions 38*a*1 and 38*a*2 are described as the multiple protrusions, but the number of types of the multiple protrusions may be three or more.

The following describes a third modification.

Figure 8A:
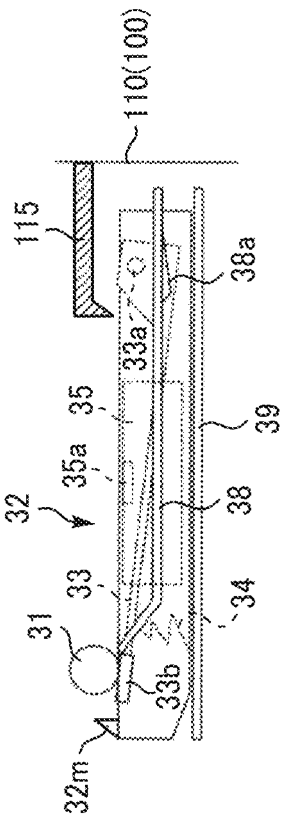
FIGS. 8A to 8C are schematic diagrams illustrating a sheet container according to a third modification to illustrate operations to draw the feed tray from the body of the image forming apparatus.
Figure 8B:
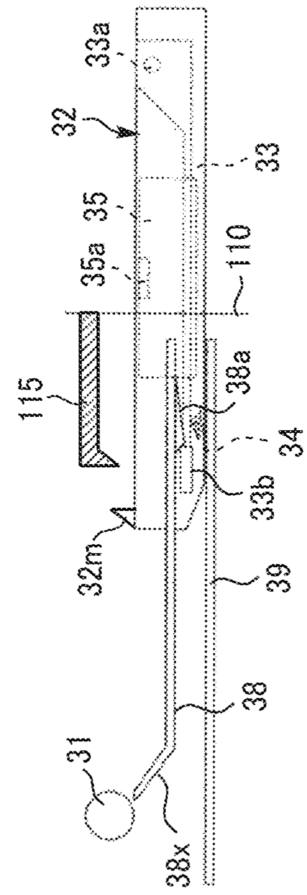
Figure 8C:
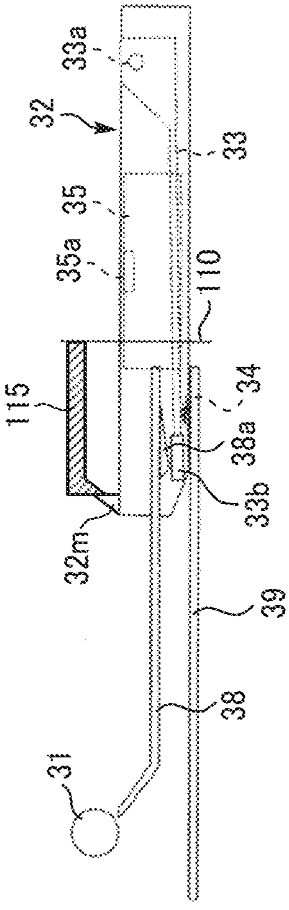

As illustrated in FIGS. 8A to 8C, the sheet container 30 according to the third modification also includes the protrusion 38*a* and the contact 33*b* as a first contact. In addition, the sheet container 30 according to the third modification includes a body side contact 115 and a second contact 32*m*. The body side contact 115 is disposed on the front side plate 110 of the body of the image forming apparatus 100 and extends toward the inside of the image forming apparatus 100. The body side contact 115 has a distal end projecting downward. The second contact 32*m* is disposed on an upper side of an upstream end (a left end in FIG. 8) of the feed tray 32 in the drawing direction and protrudes upward. When the feed tray 32 is drawn from the body of the image forming apparatus 100, the first contact 33*b* abuts on the protrusion 38*a* as illustrated in FIG. 8B, the feed tray 32 is further drawn downstream in the drawing direction, and the second contact 32*m* on the feed tray 32 abuts on the body side contact 115 as illustrated in FIG. 8C to prevent the feed tray 32 from being drawn.

In other words, drawing the feed tray 32 installed in the body of the image forming apparatus 100 as illustrated in FIG. 8A causes the contacts 33*b* as the first contacts on the stacking plate 33 to come into contact with the protrusions 38*a* as first contacted portions on the upper guide rails 38 as illustrated in FIG. 8B, which temporarily restricts further drawing the feed tray 32. To further draw the feed tray 32, the operator uses the force larger than the initial force to draw the feed tray 32. However, before the feed tray 32 is completely pulled out from the body of the image forming apparatus 100, the second contact 32*m* comes into contact with the body side contact 115, which restricts further drawing the feed tray 32.

The above-described structure is also less likely to cause the disadvantage that the feed tray 32 is excessively drawn from the body of the image forming apparatus 100 in the drawing direction and falls off from the body of the image forming apparatus 100.

In the third modification, removing the body side contact 115 from the front side plate 110 or inclining the feed tray 32 can completely pull out the feed tray 32 illustrated in FIG. 8C from the body of the image forming apparatus 100.

As described above, the sheet container 30 according to the present embodiment includes the feed tray 32 installed so as to be insertable and removable in the horizontal direction with respect to the body of the image forming apparatus 100, and multiple sheets P can be loaded on the feed tray 32. In addition, the image forming apparatus 100 includes the protrusion 38*a* in the downstream portion of the body of the image forming apparatus 100 in the drawing direction. The contact 33*b* is in the upstream portion of the feed tray 32 in the drawing direction. Drawing the feed tray 32 causes the contact 33*b* to contact the protrusion 38*a* and prevent the feed tray 32 from being further drawn in the drawing direction.

The above-described structure is less likely to cause the disadvantage that the feed tray 32 is excessively drawn from the body of the image forming apparatus 100 in the drawing direction and falls off from the body of the image forming apparatus 100.

It is to be noted that the image forming apparatus 100 according to an embodiment of this disclosure employs a monochrome image forming apparatus but the configuration of the image forming apparatus 100 is not limited thereto. For example, a color image forming apparatus is also applicable to achieve the effect of this disclosure.

Further, it is to be noted that the image forming apparatus 100 that employs electrophotography is applied in the present embodiment of this disclosure. However, the configuration of the image forming apparatus 100 is not limited thereto but can be applied to any image forming apparatus having different methods. For example, this disclosure is also applicable to an image forming apparatus that employs an inkjet method or to an offset printing machine.

Furthermore, the above-described embodiments of the present disclosure are applied to the sheet container 30 including the feed roller 31 that feeds the sheet P stored in the feed tray 32 atus 30. However, the present disclosure is not limited to the above-described sheet container including the above-described sheet feeder. For example, the present disclosure is also applicable to a sheet feeder including the feed roller and a separation roller or a sheet feeder including the feed roller, the separation roller, and a pick-up roller.

In the present embodiment, the present disclosure is applied to the sheet container 30 incorporated in the image forming apparatus 100, but the present disclosure can be applied to a sheet container externally attached to the image forming apparatus 100 (for example, a large-capacity sheet feeding bank).

Any of the cases described above exhibits the same advantages as the advantages of the present embodiment.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims. For example, the number, position, shape, and so on of the above-described components are not limited to the number, position, shape, and so on of the above-described embodiment unless in particular specified but may be any suitable number, position, shape, and so on.

In the present description, the term "sheet" is defined as any sheet-like recording medium, such as general paper, coated paper, label paper, overhead projector (OHP) transparency, or a film sheet.

Aspects of the present disclosure are, for example, as follows.

First Aspect

In a first aspect, a sheet container includes a body and a feed tray. The body includes a guide rail having a protrusion at a contact position. The feed tray loads multiple sheets. the feed tray is insertable to and removable from the body along the guide rail in a horizontal direction and including a contact in an upstream portion of the feed tray in a drawing direction along the horizontal direction. In response to the feed tray drawn from the body to the contact position, the contact contacts the protrusion to restrict drawing of the feed tray from the body.

Second Aspect

In a second aspect, the guide rail in the body of the sheet container according to the first aspect extends in the horizontal direction. The feed tray includes a side plate and a projection. The side plate extends in the horizontal direction. The projection is on the side plate, and projects in a width direction orthogonal to the horizontal direction. The projection extends in the horizontal direction and is slidable on the guide rail. The protrusion has an inclined face along which the contact portion is slidable, and the inclined face has an angle to generate a climbing force for the contact to climb over the inclined face larger than a force for the contact to slide along the guide rail.

Third Aspect

In a third aspect, the feed tray in the sheet container according to the second aspect further includes a support shaft and a stacking plate, and the body further includes a feed roller and a spring. The support shaft is in a downstream portion of the feed tray in the drawing direction. The stacking plate is rotatable about the support shaft and loadable the multiple sheets. The feed roller is above the feed tray in an upstream portion of the body in the drawing direction. The spring pushes the stacking plate upward to rotate the stacking plate and bring the sheet on the stacking plate into contact with the feed roller. The guide rail includes an upper guide rail and a lower guide rail. The upper guide rail and the lower guide rail are disposed at a side end of the body in the width direction. The upper guide rail and the lower guide rail extend from the upstream portion of the body to a downstream portion of the body in the drawing direction.

Fourth Aspect

In a fourth aspect, the side plate in the sheet container according to the third aspect has an opening. The protrusion of the body is at a downstream portion of the upper guide rail in the drawing direction, and the contact of the feed tray is disposed upstream portion of the feed tray in the drawing direction and projects outside the side plate in the width direction through the opening.

Fifth Aspect

In a fifth aspect, the contact in the sheet container according to the fourth aspect is pressed against a lower face of the upper guide rail by the spring to contact the lower face.

Sixth Aspect

In a sixth aspect, the protrusion in the sheet container according to the fourth aspect or the fifth aspect is selected from multiple protrusions having different heights, and the protrusion is attachable to and detachable from the upper guide rail.

Seventh Aspect

In a seventh aspect, the sheet container according to any one of the third to sixth aspects further includes a pair of side fences interposing the stacking plate, and the pair of side fences is movable in the width direction in a state in which the feed tray is drawn to the contact position.

Eighth Aspect

In an eighth aspect, the feed tray in the sheet container according to any one of the third to seventh aspects further includes a link rotatable on the side plate, and the body includes a pushing projection near the feed roller. The link pushes the contact of the feed tray removed from the body downward against a force of the spring, and the pushing projection rotates the link of the feed tray inserted into the body to separate the link from the contact.

Ninth Aspect

In a ninth aspect, the sheet container according to any one of the first to eighth aspects includes the contact that has a first contact face contacting the protrusion and the protrusion that has a second contact face contacting the contact. At least one of the first contact face or the second contact face has a friction coefficient smaller than a friction coefficient of a side plate of the feed tray.

Tenth Aspect

In a tenth aspect, the sheet container according to any one of the first to ninth aspects further includes another contact on the feed tray and a body side contact on the body, and the feed tray drawn from the body causes said another contact to contact the body side contact to prevent the feed tray from being drawn out from the body.

Eleventh Aspect

In an eleventh aspect, an image forming apparatus includes the sheet container according to any one of the first to tenth aspects.

Twelfth Aspect

In a twelfth aspect, the image forming apparatus according to the eleventh aspect further includes an apparatus body including the body, an apparatus side plate, a lower guide rail and an upper guide rail. The apparatus side plate is at an end of the apparatus body in a width direction orthogonal to the horizontal direction. The lower guide rail extends from an upstream portion of the body in the drawing direction to a downstream portion of the body in the drawing direction on the apparatus side plate. The upper guide rail is above the lower guide rail and extends from the upstream portion to the downstream portion on the apparatus side plate. A gap is formed between the lower guide rail and the upper guide rail. The protrusion protrudes from the upper guide rail toward the lower guide rail.

Thirteenth Aspect

In a thirteenth aspect, the upper guide rail in the image forming apparatus according to the twelfth aspect includes an upstream tapered portion in an upstream portion of the upper guide rail in the drawing direction, and a distance between the upstream tapered portion and the lower guide rail increases toward an upstream end of the body in the drawing direction.

Fourteenth Aspect

In a fourteenth aspect, an image forming apparatus includes an apparatus body and a feed tray. The feed tray is insertable to and removable from the apparatus body in a horizontal direction and loads multiple sheets. The apparatus body includes an apparatus side plate, a guide rail, a protrusion, and a feed roller. The apparatus side plate is at a side end of the apparatus body in a width direction orthogonal to the horizontal direction. The guide rail is on the apparatus side plate and extends from an upstream portion of the apparatus body in a drawing direction in which the feed tray is drawn from the apparatus body along the horizontal direction to a downstream portion of the apparatus body in the drawing direction. The protrusion is on a downstream portion of the guide rail in the drawing direction. The feed roller is above the feed tray in an upstream portion of the apparatus body in the drawing direction. The feed tray includes a support shaft, a stacking plate, a spring, a tray side plate, a projection, and a contact. The support shaft is in a downstream portion of the feed tray in a drawing direction in which the feed tray is drawn from the apparatus body along the horizontal direction. The stacking plate is rotatable about the support shaft in the feed tray. The spring pushes and rotates the stacking plate about the support shaft and brings the sheet on the stacking plate into contact with the feed roller. The tray side plate is at a side end of the feed tray in the width direction and has an opening. The contact projects outside the tray side plate in the width direction through the opening of the tray side plate from an upstream portion of the stacking plate in the drawing direction. The contact is slidable on the guide rail, and the protrusion contacts the contact of the feed tray drawn from the apparatus body.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A sheet container comprising:

a body including a guide rail having a protrusion at a contact position; and a feed tray to load multiple sheets, the feed tray insertable to and removable from the body along the guide rail in a horizontal direction and including a contact in an upstream portion of the feed tray in a drawing direction along the horizontal direction, wherein, in response to the feed tray drawn from the body to the contact position, the contact contacts the protrusion to restrict drawing of the feed tray from the body, wherein:

the guide rail in the body extends in the horizontal direction, the feed tray includes:

a side plate extending in the horizontal direction; and a projection on the side plate projecting in a width direction orthogonal to the horizontal direction and extending in the horizontal direction to be slidable along the guide rail, the protrusion has an inclined face along which the contact is slidable, and the inclined face has an angle to generate a climbing force for the contact to climb over the inclined face larger than a force for the contact to slide along the guide rail, the feed tray further includes:

a spring;

a support shaft in a downstream portion of the feed tray in the drawing direction; and a stacking plate rotatable about the support shaft and loadable the multiple sheets, and the body further includes:

a feed roller above the feed tray in an upstream portion of the body in the drawing direction, wherein the spring pushes the stacking plate upward to:

rotate the stacking plate; and bring the sheet on the stacking plate into contact with the feed roller, and the guide rail includes:

an upper guide rail; and a lower guide rail, the upper guide rail and the lower guide rail are at a side end of the body in the width direction, the upper guide rail and the lower guide rail extend from the upstream portion of the body to a downstream portion of the body in the drawing direction, the side plate has an opening, the protrusion of the body is at a downstream portion of the upper guide rail in the drawing direction, the contact of the feed tray is disposed upstream portion of the feed tray in the drawing direction and projects outside the side plate in the width direction through the opening, the contact is pressed against a lower face of the upper guide rail by the spring to contact the lower face.

2. The sheet container according to claim 1, wherein;

the protrusion is selected from multiple protrusions having different heights, and the protrusion is attachable to and detachable from the upper guide rail.

3. The sheet container according to claim 1, further comprising:

a pair of side fences interposing the stacking plate, wherein the pair of side fences is movable in the width direction in a state in which the feed tray is drawn to the contact position.

4. The sheet container according to claim 1, wherein;

the feed tray further includes a link rotatable on the side plate, the body includes a pushing projection near the feed roller, the link pushes the contact of the feed tray removed from the body downward against a force of the spring, and the pushing projection rotates the link of the feed tray inserted into the body to separate the link from the contact.

5. The sheet container according to claim 1, wherein;

the contact has a first contact face contacting the protrusion, the protrusion has a second contact face contacting the contact, and at least one of the first contact face or the second contact face has a friction coefficient smaller than a friction coefficient of a side plate of the feed tray.

6. The sheet container according to claim 1, further comprising:

another contact on the feed tray; and a body side contact on the body, wherein the feed tray drawn from the body causes said another contact to contact the body side contact to prevent the feed tray from being drawn out from the body.

7. The sheet container according to claim 1, wherein:

the protrusion has an upstream inclined face and a downstream inclined face, and the upstream inclined face is inclined more steeply than the downstream inclined face.

8. The sheet container according to claim 1, wherein:

at the contact position, a portion of the feed tray including a pair of movable side fences is exposed outside of the body to allow user operation of the side fences.

9. The sheet container according to claim 1, wherein:

the contact is located at an end of the stacking plate opposite an end of the stacking plate supported by the support shaft.

10. An image forming apparatus, comprising:

a sheet container including:

a body including a guide rail having a protrusion at a contact position; and a feed tray to load multiple sheets, the feed tray insertable to and removable from the body along the guide rail in a horizontal direction and including a contact in an upstream portion of the feed tray in a drawing direction along the horizontal direction, wherein, in response to the feed tray drawn from the body to the contact position, the contact contacts the protrusion to restrict drawing of the feed tray from the body, the image forming apparatus further comprising:

an apparatus body including the body;

an apparatus side plate at one end of the apparatus body in a width direction orthogonal to the horizontal direction;

a lower guide rail extending from an upstream portion of the body in the drawing direction to a downstream portion of the body in the drawing direction on the apparatus side plate; and an upper guide rail above the lower guide rail and extending from the upstream portion to the downstream portion on the apparatus side plate, wherein a gap is formed between the lower guide rail and the upper guide rail, and the protrusion protrudes from the upper guide rail toward the lower guide rail.

11. The image forming apparatus according to claim 10, wherein;

the upper guide rail includes an upstream tapered portion in an upstream portion of the upper guide rail in the drawing direction, and a distance between the upstream tapered portion and the lower guide rail increases toward an upstream end of the body in the drawing direction.

12. An image forming apparatus comprising:

an apparatus body; and a feed tray insertable to and removable from the apparatus body in a horizontal direction, the feed tray to load multiple sheets;

wherein the apparatus body includes:

an apparatus side plate at a side end of the apparatus body in a width direction orthogonal to the horizontal direction;

a lower guide rail extending from an upstream portion of the body in the drawing direction to a downstream portion of the body in the drawing direction on the apparatus side plate;

an upper guide rail above the lower guide rail and extending from the upstream portion to the downstream portion on the apparatus side plate, wherein there is a gap between the lower guide rail and the upper guide rail;

a protrusion on a downstream portion of the upper guide rail in the drawing direction, the protrusion protruding from the upper guide rail toward the lower guide rail; and a feed roller above the feed tray in an upstream portion of the apparatus body in the drawing direction;

wherein:

the feed tray includes:

a support shaft in a downstream portion of the feed tray in the drawing direction;

a stacking plate rotatable about the support shaft in the feed tray;

a spring to push and rotate the stacking plate about the support shaft, and bring the sheet on the stacking plate into contact with the feed roller;

a tray side plate at a side end of the feed tray in the width direction, the tray side plate having an opening;

a projection on the tray side plate projecting in the width direction and extending in the horizontal direction to be slidable along the lower guide rail; and a contact projecting outside the tray side plate in the width direction through the opening of the tray side plate from an upstream portion of the stacking plate in the drawing direction, the contact is slidable on the upper guide rail, and the protrusion contacts the contact of the feed tray drawn from the apparatus body.

* * * * *